United States Patent
Itoh et al.

[11] Patent Number: 5,858,278
[45] Date of Patent: Jan. 12, 1999

[54] PHOSPHOR AND METHOD FOR PRODUCING SAME

[75] Inventors: Shigeo Itoh; Hitoshi Toki; Fumiaki Kataoka; Hisashi Kanie, all of Chiba-ken, Japan

[73] Assignee: Futaba Denshi Kogyo K.K., Japan

[21] Appl. No.: 803,508

[22] Filed: Feb. 20, 1997

[30] Foreign Application Priority Data

Feb. 29, 1996 [JP] Japan .................................. 8-043032

[51] Int. Cl.$^6$ .................................................. C09K 11/62
[52] U.S. Cl. ........................ 252/301.4 R; 252/301.6 R
[58] Field of Search .................. 252/301.4 R, 301.6 R; 257/102, 103, 13; 117/952

[56] References Cited

U.S. PATENT DOCUMENTS

| | | | |
|---|---|---|---|
| 3,819,974 | 6/1974 | Stevenson et al. | 313/108 D |
| 4,144,116 | 3/1979 | Jacob et al. | 117/952 |
| 5,385,862 | 1/1995 | Moustakas | 437/107 |
| 5,637,146 | 6/1997 | Chyi | 117/200 |

FOREIGN PATENT DOCUMENTS 51-41686  4/1976  Japan .

OTHER PUBLICATIONS

Chem. Abstract. Citation 123:183777, Zhu et al, "Growth and Characterization of p/n–type GaN Grown at Reduced Substance Temperatures by Plasma Enhanced (PE–)MOCVD", Inst. Phys. Conf. Ser., 141, pp. 113–118, no month 1995.

*Primary Examiner*—Melissa Bonner
*Attorney, Agent, or Firm*—Breiner & Breiner

[57] ABSTRACT

A phosphor capable of being kept from being affected by oxygen during production thereof, carrying out luminescence due to excitation by electrons, selectively realizing various luminous colors depending on selection of starting materials and exhibiting satisfactory luminance and life characteristics. The phosphor is represented by a chemical formula $Ga_{1-x}In_xN:A$ ($0 \leq x < 0.8$, $A=Zn$ or $Mg$) and prepared by mixing starting materials containing at least an oxygen-free gallium compound and an oxygen-free doping substance to prepare a mixture and heating the mixture in a nitrogen-containing atmosphere.

4 Claims, 3 Drawing Sheets

PHOSPHOR AND METHOD FOR PRODUCING SAME

BACKGROUND OF THE INVENTION

This invention relates to a phosphor and a method for producing the same, and more particularly to a phosphor mainly made of a solid solution which is formed of gallium nitride and indium nitride and doped with a doping substance, resulting in emitting light due to excitation by electrons, and a method for producing such a phosphor.

Japanese Patent Application Laid-Open Publication No. 41686/1976 discloses a phosphor of which a matrix is made by subjecting $Ga_2O_3$ to nitriding in an ammonia atmosphere and doped with Cd. The phosphor disclosed is not applied to luminescence due to excitation by electrons and the Japanese publication described above is silent concerning luminescence due to excitation by electrons. A phosphor GaN which is doped with Zn or Mg acting as a dopant is known in the field of an LED, however, it is not a phosphor excited by electrons.

Nitriding of $Ga_2O_3$ in a nitrogen atmosphere causes $Ga_2O_3$ to be nitrided from a surface thereof. However, exposure of the nitrided $Ga_2O_3$ to a high temperature causes a surface thereof to be oxidized again. More specifically, gallium nitride is apt to cause nitrogen to be removed therefrom and be oxidized by oxygen. Thus, use of $Ga_2O_3$ as a starting material for the phosphor renders complete nitriding of $Ga_2O_3$ highly difficult, so that gallium nitride obtained fails to exhibit satisfactory quality because oxygen remaining in the nitride adversely affects luminescence of the phosphor. Also, supposing that gallium nitride were applied to an element excited by electrons, a powder of gallium nitride acting as a phosphor would be deposited on a substrate and then subject to calcination in an ambient atmosphere. Thus, the phosphor would be subject to various heat treatments during manufacturing of the element, resulting in a surface of the phosphor being possibly deteriorated.

Also, doping of gallium nitride with a doping material by a normal thermally-equilibrated reaction requires to increase a reaction temperature to a level as high as 1100° C. or more. Unfortunately, gallium nitride starts sublimation at a temperature of about 800° C. Thus, production of the gallium nitride phosphor by the normal thermally-equilibrated reaction requires to set troublesome conditions such as heating under an increased pressure, so that the production is rendered highly difficult or substantially impossible.

SUMMARY OF THE INVENTION

The present invention has been made in view of the foregoing disadvantage of the prior art.

Accordingly, it is an object of the present invention to provide a phosphor mainly containing gallium nitride or the like which is capable of exhibiting increased quality.

It is another object of the present invention to provide a phosphor which is capable of carrying out luminescence due to excitation by electrons without being adversely affected by oxygen.

It is a further object of the present invention to provide a phosphor which is capable of realizing luminescence of various luminous colors depending on selection of starting materials.

It is still another object of the present invention to provide a phosphor which is capable of exhibiting satisfactory luminous characteristics and life characteristics.

It is a still further object of the present invention to provide a method for producing a phosphor which is capable of providing a phosphor exhibiting the above-described advantages.

In accordance with one aspect of the present invention, a phosphor is provided, which is represented by a chemical formula $Ga_{1-x}In_xN$: A ($0 \leq x < 0.8$, A=Zn or Mg).

In accordance with another aspect of the present invention, a method for producing a phosphor represented by a chemical formula $Ga_{1-x}In_xN$:A ($0 \leq x < 0.8$, A=Zn or Mg) is provided. The method comprises the step of mixing starting materials containing at least an oxygen-free gallium compound and an oxygen-free doping substance to prepare a mixture. The oxygen-free gallium compound and oxygen-free doping substance are selected from a starting material group consisting of the oxygen-free gallium compound, an oxygen-free indium compound and the oxygen-free doping substance. The method also comprises the step of heating the mixture in a nitrogen-containing atmosphere to prepare the phosphor.

Also, in accordance with this aspect of the present invention, a method for producing a phosphor represented by a chemical formula $Ga_{1-x}In_xN$:A ($0 \leq x < 0.8$, A=Zn or Mg) is provided. The method comprises the step of mixing starting materials containing at least an oxygen-free gallium compound and an oxygen-free doping substance to prepare a mixture. The oxygen-free gallium compound and oxygen-free doping substance are selected from a starting material group consisting of the oxygen-free gallium compound, an oxygen-free indium compound and the oxygen-free doping substance. The method also comprises the step of subjecting the mixture to rapid heating and rapid cooling in a nitrogen-containing atmosphere to prepare the phosphor.

As described above, the phosphor of the present invention is represented by a chemical formula $Ga_{1-x}In_xN$:A ($0 \leq x < 0.8$, A=Zn or Mg). Thus, the phosphor includes a matrix which is a solid solution of GaN and InN. The matrix is GaN when x is 0 and GaInN when x is more than 0 and less than 0.8. Also, the phosphor includes a dopant which is Zn or Mg.

For production of the phosphor, the starting material group containing at least the oxygen-free gallium compound such as, for example, gallium sulfide is prepared. The starting material group may further contain the oxygen-free indium compound such as, for example, indium sulfide and the oxygen-free doping substance such as, for example, sulfide or chloride of Zn, sulfide or chloride of Mg, or the like, as required.

From the starting material group, the starting materials containing at least the oxygen-free gallium compound and the oxygen-free doping substance are selected and mixed together to prepare the above-described mixture. Then, the mixture is subject to rapid heating and rapid cooling in a nitrogen-containing atmosphere which is free from oxygen or does not contain oxygen. The rapid heating and rapid cooling are carried out by means of plasma at an elevated temperature. More particularly, reactive gas containing nitrogen and the starting materials are introduced into a reaction vessel and plasma at a temperature as high as, for example, about 10,000K is generated in the reaction vessel using any suitable heating means, so that the starting materials dropping in the reaction vessel are passed through the plasma. The starting materials are rapidly heated and cooled at a rate of $1 \times 10^7$ to $1 \times 10^4$ °C./s by the plasma. This results in the starting materials being melted in a moment in the plasma and partially evaporated during the heating and then re-condensed in a moment during the cooling. Thus, the present invention creates thermal non-equilibrium wherein the starting materials are suddenly reduced in temperature when the materials are out of the plasma zone at the high temperature, so that the starting materials may be rapidly heated and cooled, resulting in the phosphor of a spherical shape represented by a chemical formula $Ga_{1-x}In_xN:A$ ($0 \leq x < 0.8$, A=Zn, Mg or Cd) being provided.

Cooling of the heated starting materials by conventional cooling techniques causes a cooling rate thereof to be limited to at most a level as low as $1 \times 10^2$ °C./s. Cooling of the materials at such a reduced rate causes elements increased in vapor pressure to be removed therefrom at various temperatures during the cooling, leading to a failure to ensure a composition of the materials obtained during the heating.

For example, doping of the doping substance into the matrix by means of $N_2$ or $NH_3$ by conventional thermal diffusion techniques is preferably carried out under heating conditions at, for example, about 1100° C. Unfortunately, GaN produced starts to be decomposed at about 800° C., so that a failure in strict setting of the synthetic conditions readily causes a composition of the phosphor to be readily varied. Thus, sublimation of the product and reaction of the starting materials concurrently proceed, to thereby substantially fail to provide the phosphor with satisfactory crystallizability.

On the contrary, the present invention minimizes a variation in composition of the phosphor because it permits the starting materials to be melted and nitrided in a moment by plasma and re-agglomerated in a moment without evaporation, resulting in nitriding of the starting materials being accomplished with increased efficiency. For example, when $N_2$ is used as atmospheric gas, $N_2$ dissociates at a temperature of 3000° C. or more and the starting materials are melted in a moment at such a high temperature. Concurrently, the starting materials are rounded due to surface tension while dropping in the plasma, resulting in evaporating from a surface thereof. At this time, oxygen increased in partial pressure volatilizes, so that nitriding of the starting materials advances in a moment. During the time, evaporation of the starting materials progresses, however, the cooling is carried out at a rate as high as $1 \times 10^7$ to $1 \times 10^4$ °C./s, so that the phosphor having a spherical shape while being kept at a temperature at which the nitriding advances may be obtained.

Now, properties of the phosphor thus obtained by the method of the present invention will be described with reference to FIGS. 1 to 5.

FIG. 1 shows an emission spectrum of the phosphor of the present invention of which the matrix is made of GaN. The phosphor has an intensive peak near 450 nm when it emits light due to impingement of electrons thereon, resulting in having a blue luminous color.

FIG. 2 shows relationship between a content (mol %) of the doping substance (Zn or Mg) in the phosphor of the present invention and relative intensity of luminescence of the phosphor due to impingement of electrons thereon. A content of the doping substance is preferably between 0.01 mol % and 0.3 mol %, wherein a relative value of luminous intensity of the phosphor is about 70% or more based on a peak value thereof.

FIG. 3 shows relationship between a mixing ratio of an GaN crystal and an InN crystal in the phosphor of the present invention and an energy gap of the phosphor. It will be noted that an energy gap of the phosphor is varied depending on the crystal mixing ratio, leading to a variation in luminous color of the phosphor. For example, an increase in ratio of Ga permits the luminous color to approach blue away from green, whereas an increase in ratio of InN permits it to approach red.

FIG. 4 shows relationship between an anode voltage in a fluorescent display device having an anode provided thereon with the phosphor of the present invention and luminance of the phosphor which relationship is obtained when the fluorescent display device is driven. FIG. 4 indicates that GaN:Mg and GaInN:Zn which are examples of the phosphor of the present invention each are increased in luminance relative to the anode voltage as compared with GaN:Cd which is a convention phosphor.

FIG. 5 shows relationship between a relative value of luminance of a fluorescent display device having an anode provided thereon with a phosphor of the present invention based on initial luminance thereof defined to be 100 and continuous lighting time of the device which relationship is obtained when the fluorescent display device is subject to continuous lighting operation. It will be noted that the phosphor of the present invention exhibits luminance substantially identical with the initial luminance even after it is subject to continuous lighting operation over about 2000 hours.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
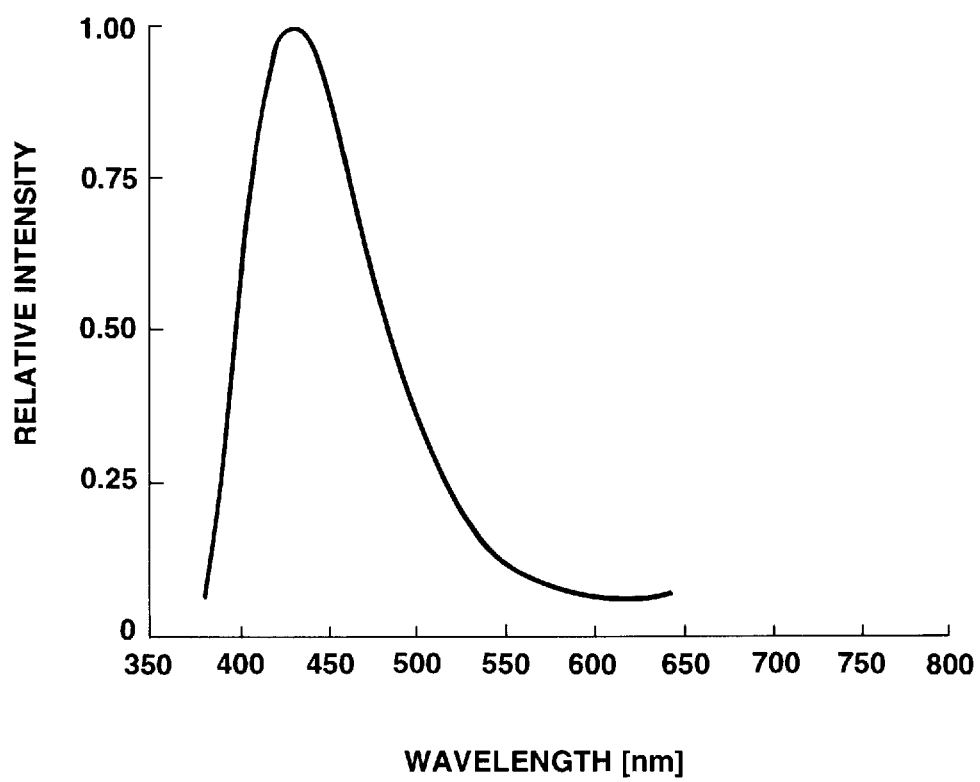
FIG. 1 is a graphical representation showing an emission spectrum of a phosphor of the present invention which has a matrix made of GaN.

Now, the present invention will be detailedly described hereinafter.

First, a method for producing a phosphor according to the present invention will be described. In a preferred embodiment of the method of the present invention, a heat-treating apparatus adapted to generate plasma may be used. The heat-treating apparatus includes a vacuum tube made of quartz and evacuated to a high vacuum. The quartz tube is connected at an upper end thereof to an inlet tube, through which carrier gas and reactive gas are introduced into the quartz tube. The quartz tube is connected at a lower end thereof to a suction tube, through which the quartz tube is evacuated, so that a high vacuum may be formed therein.

The quartz tube has a heating region or zone defined in a part thereof. Also, the quartz tube is provided on an outer periphery thereof with an RF coil acting as a radiofrequency induction heating means in a manner to surround the heating zone. The carrier gas and reactive gas are introduced into the quartz tube while keeping starting materials for the phosphor floated therein. Then, both gases are passed through the heating zone, during which the gases are heated by the RF coil, so that plasma at an elevated temperature may be generated in the heating zone.

The carrier gas acts to support the thus-generated plasma as well and Ar or the like may be used as the carrier gas. The reactive gas may comprise gas which contains nitrogen and does not contain oxygen, such as, for example, $NH_3$, $N_2$ or the like.

The method of the present invention which is constructed so as to generate plasma for heating permits thermal non-equilibrium to be obtained in the quartz tube which causes a temperature of plasma generated in the heating zone to be increased to a level as high as 10,000° C. to 15,000° C. and a temperature at a portion of the quartz tube out of the heating zone to be suddenly reduced. Thus, particles of the starting materials for the phosphor are subject to sudden or rapid heating and rapid cooling while being kept separate from each other. The cooling is carried out at a cooling rate of between $1 \times 10^7$ °C./s and $1 \times 10^4$ °C./s.

Now, the method of the present invention practiced using the heat-treating apparatus constructed as described above will be described hereinafter with reference to the following examples, however, these examples are intended to illustrate the invention and are not to be construed to limit the scope of the invention.

EXAMPLE 1

In Example 1, a GaN:Mg phosphor was prepared. 23.5 g of $Ga_2S_3$ and 0.04 g of $MgCl_2$ (0.2 mol % of Mg based on a matrix of the phosphor) which are starting materials for the phosphor were mixed together to prepare a mixture, which was then placed in the quartz tube while being put on a quartz boat. The mixture was maintained at a temperature of 1100° C. for 10 hours while flowing ammonia through the quartz tube at a flow rate of 10 ml/min, resulting in the GaN:Mg phosphor being obtained according to the following reaction:

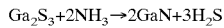

$Ga_2S_3 + 2NH_3 \rightarrow 2GaN + 3H_2S$

Then, the thus-obtained GaN:Mg phosphor was observed by means of a scanning electron microscope (SEM). As a result, it was found that in contrast with inventors' supposition that the phosphor would be acicular, it has a planar particulate shape.

The thus-obtained phosphor was used to manufacture a fluorescent display device. More specifically, the phosphor was coated on each of anode conductors arranged on an anode substrate for a fluorescent display device by means of an organic binder. Then, the anode substrate was subject to calcination at 500° C. in an ambient atmosphere, resulting in the binder being removed. Thereafter, various electrodes were arranged on the anode substrate and a casing was sealedly mounted on the anode substrate, to thereby form an envelope, which was then evacuated to a high vacuum and sealed, resulting in a fluorescent display device being provided. Subsequently, a voltage of 50V was applied to anodes of the thus-formed fluorescent display device and likewise a voltage of a suitable level was applied to each of cathodes and control electrodes, resulting in electrons emitted from the cathodes being impinged on the phosphor on each of the anodes, leading to luminescence of the phosphor.

FIG. 1 shows a luminous spectrum of the phosphor of the example which contains GaN in the form of a matrix. It will be noted that the phosphor exhibits an intensive peak near 450 nm when it emits light due to impingement of electrons thereon and emits light of a blue color.

Figure 2:
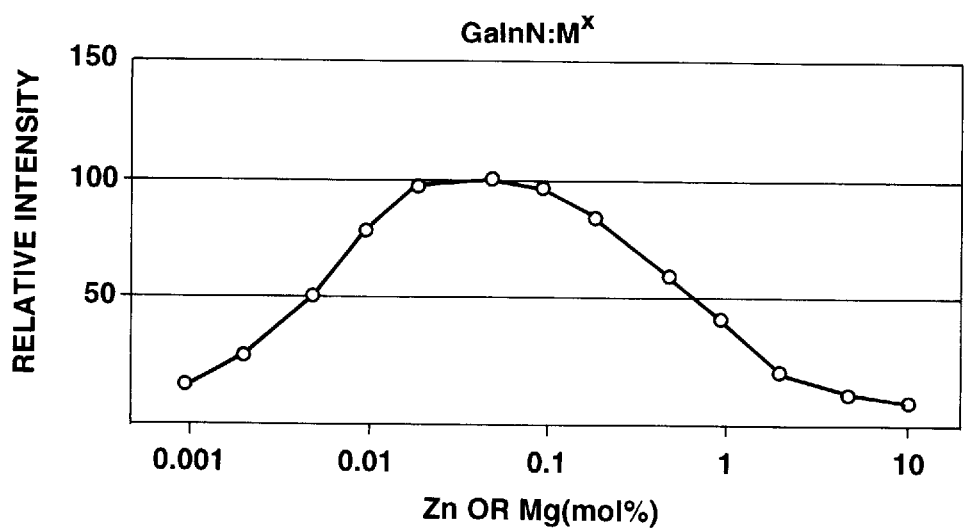
FIG. 2 is a graphical representation showing relationship between a content of a doping substance in a phosphor of the present invention and relative intensity of luminescence of the phosphor due to impingement of electrons thereon.

A plurality of such phosphors were prepared while varying the amount of MgCl2 within a range of between 0.001 mol % and 10 mol %. Relationship between mol % of Mg in each of the phosphors and relative intensity of luminance in luminescence of the phosphor due to impingement of electrons was as in FIG. 2 and a preferred range of mol % of Mg which is a doping material was as described above.

Figure 4:
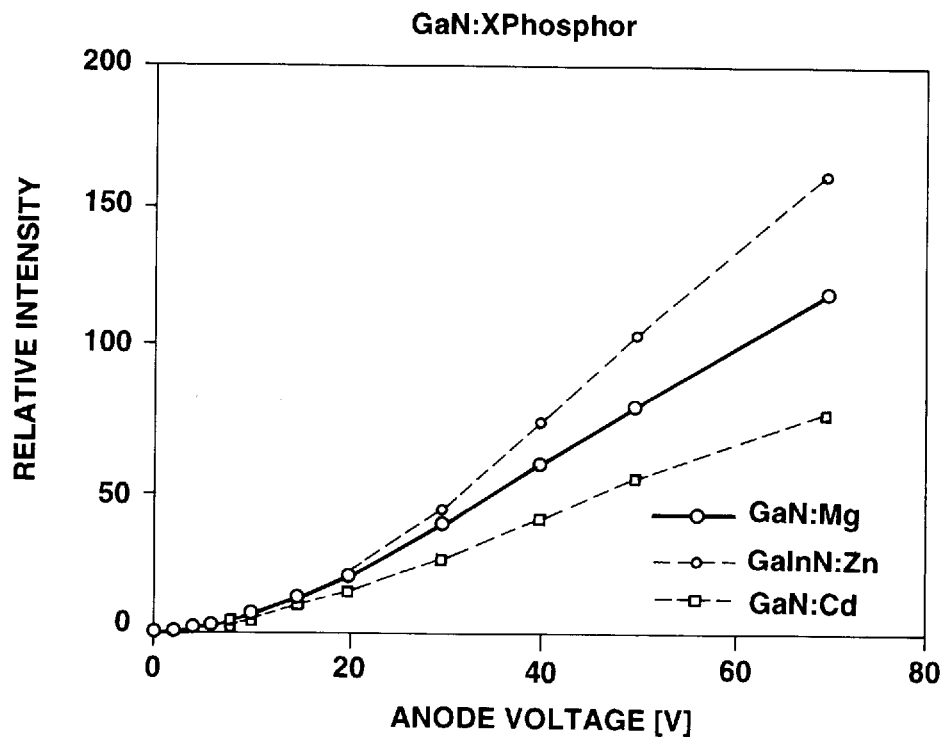
FIG. 4 is a graphical representation showing relationship between an anode voltage in a fluorescent display device having an anode provided thereon with a phosphor of the present invention and luminance of the phosphor which relationship is obtained when the fluorescent display device is driven.

Relationship between an anode voltage Va and a relative value of luminance of the phosphor in the fluorescent display device described above was as in the above-described GaN:Mg phosphor shown in FIG. 4.

Figure 5:
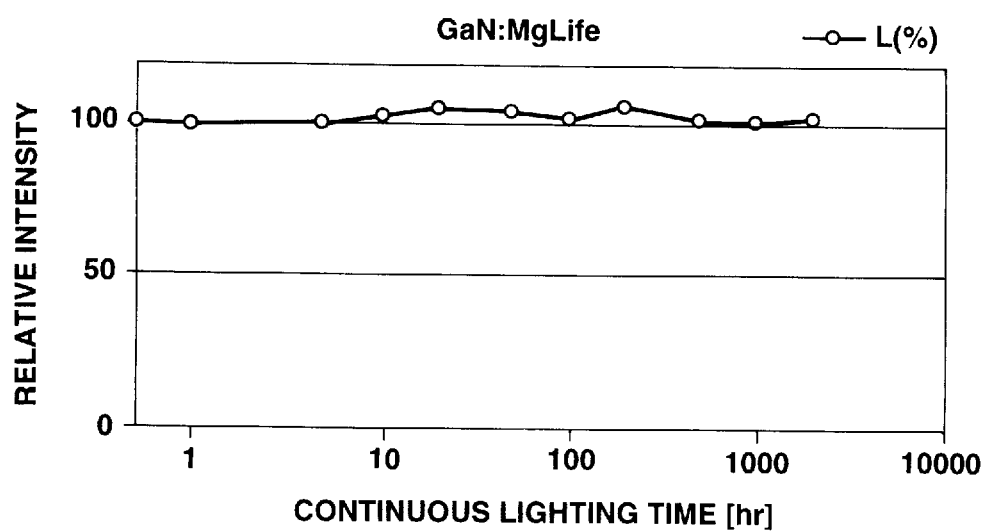
FIG. 5 is a graphical representation showing relationship between a relative value of luminance of a fluorescent display device having an anode provided thereon with a phosphor of the present invention based on initial luminance thereof and continuous lighting time of the device which relationship is obtained when the fluorescent display device is subject to continuous lighting operation.

Relationship between a value of luminance of the phosphor relative to initial luminance thereof defined to be 100 and continuous lighting time which relationship is obtained when the fluorescent display device is subject to continuous lighting operation was as in FIG. 5.

EXAMPLE 2

In Example 2, a GaInN:Zn phosphor was prepared.

For this purpose, 16.4 g of $Ga_2S_3$, 9.8 g of $In_2S_3$ and 0.02 g of ZnS (0.2 mol % of Zn) which are starting materials for the phosphor were mixed together to prepare a mixture, which was then placed in the quartz tube while being put on a quartz boat. The mixture was maintained at a temperature of 1150° C. for 6 hours while flowing ammonia through the quartz tube at a flow rate of 10 ml/min, resulting in the GaInN:Zn phosphor being prepared.

The thus-prepared phosphor was used for manufacturing a fluorescent display device. For this purpose, anode conductors made of a light-permeable ITO electrode were arranged on an anode substrate constituting a front side of the fluorescent display device. Then, the phosphor was coated in the form of a slurry on each of the anode conductors by means of PVA, followed by calcination of the anode substrate at 480° C. in an ambient atmosphere.

Then, a cathode substrate arranged opposite to the anode substrate was formed on an inner surface thereof with field emission cathodes acting as an electron source. For this purpose, first of all, the cathode substrate was formed thereon with cathode conductors, followed by arrangement of an insulating layer on the cathode conductors and cathode substrate. Then, a gate was formed on the insulating layer. The gate and insulating layer were subject to etching, to thereby be formed with holes extending to the cathode conductors. Subsequently, the holes were formed therein with conical emitters while putting them on the cathode conductors, resulting in application of a voltage of a suitable level to the cathode conductors and gate permitting electrons to be emitted from a tip of each of the emitters.

The anode substrate and cathode substrate were rendered opposite to each other with a predetermined micro-gap being defined therebetween and then sealedly joined at an outer periphery thereof to each other by means of an airtight spacer member such as, for example, frit glass or the like, to thereby form an envelope, which was then evacuated to a high vacuum and sealedly closed, resulting in a fluorescent display device being provided. Subsequently, a voltage of about 100V was applied to anodes of the fluorescent display device and a voltage of a suitable level was likewise applied to each of the cathode conductors and gate, resulting in electrons emitted from the cathodes being impinged on the phosphor on each of the anodes, leading to luminescence of the phosphor. Luminescence of the phosphor was externally observed through the light-permeable anode conductors and anode substrate.

Figure 3:
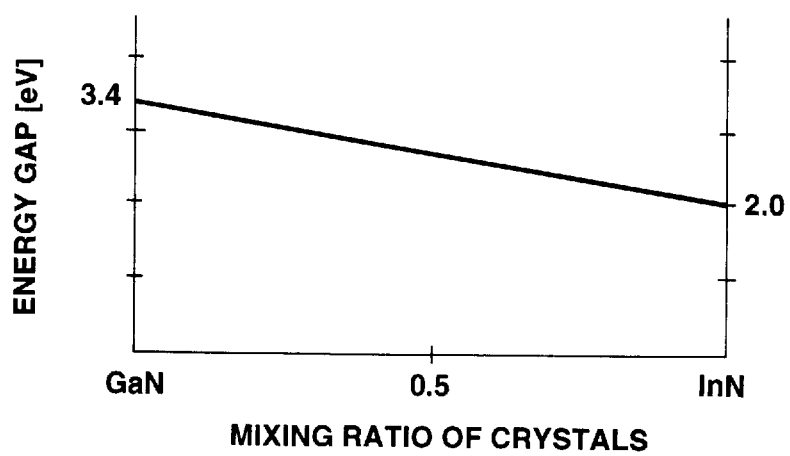
FIG. 3 is a graphical representation showing relationship between a mixing ratio of an GaN crystal and an InN crystal in a phosphor of the present invention and an energy gap of the phosphor.

Driving of the fluorescent display device under the above-described conditions permitted the phosphor to emit light of a green color. A luminous color of the phosphor was due to a difference in energy gap determined depending on a mixing ratio between GaN and InN, as shown in FIG. 3.

Relationship between an anode voltage Va and a relative value of luminance of the phosphor in the fluorescent display device described above was as in the above-described GaInN:Zn phosphor shown in FIG. 4.

In the example, ammonia was used as reactive gas. Alternatively, an amine material such as methyl amine, amyl amine or the like may be used for this purpose. Use of the amine permits the reactive temperature to be reduced as compared with use of ammonia.

EXAMPLE 3

In Example 3, a GaN:Zn phosphor was prepared.

For this purpose, 16.4 g of $Ga_2S_3$ and 0.02 g of ZnS (0.1 mol % of Zn) which are starting materials for the phosphor were mixed together to prepare a mixture, which was then placed in the quartz tube while being put on a quartz boat. The mixture was maintained at a temperature of 1150° C. for 6 hours while flowing ammonia through the quartz tube at a flow rate of 10 ml/min, resulting in the GaN:Zn phosphor being prepared.

EXAMPLE 4

In Example 4, a GaInN:Mg phosphor was prepared.

For this purpose, 16.4 g of $Ga_2S_3$, 9.8 g of $In_2S_3$ and 0.04 g of $MgCl_2$ (0.2 mol % of Mg) which are starting materials for the phosphor were fully mixed with each other to prepare a mixture, which was then placed in the quartz tube while being put on a quartz boat. The mixture was maintained at a temperature of 1150° C. for 6 hours while flowing ammonia through the quartz tube at a flow rate of 10 ml/min, resulting in the GaInN:Mg phosphor being prepared.

The phosphors obtained in Examples 3 and 4 each exhibited substantially the same advantages as described above with reference to FIGS. 1 to 3.

As can be seen from the foregoing, the present invention provides a phosphor which is kept from being affected by oxygen during production thereof, carries out luminescence due to excitation by electrons, selectively realizes various luminous colors depending on selection of starting materials and exhibits satisfactory luminance and life characteristics.

While the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for producing a phosphor represented by a formula as follows: $Ga_{1-x}In_xN:A$, wherein $0 \leq x < 0.8$, and A=Zn or Mg, comprising mixing starting materials containing at least gallium sulfide, indium sulfide, and a chloride or sulfide oxygen-free doping substance, to provide a mixture; and heating said mixture in a nitrogen-containing atmosphere to provide said phosphor.

2. A method for producing a phosphor represented by a formula as follows: $Ga_{1-x}In_xN:A$, wherein $0 \leq x < 0.8$, and A=Zn or Mg, comprising mixing starting materials containing at least gallium sulfide, indium sulfide, and a chloride or sulfide oxygen-free doping substance, to provide a mixture; and subjecting said mixture to heating to melting followed by cooling by recondensation in a nitrogen-containing atmosphere to provide said phosphor.

3. A method as defined in claim 2, wherein said heating and said cooling are carried out at a rate of $1 \times 10^7$ to $1 \times 10^4$ °C./s.

4. A method as defined in claim 2, wherein said heating and said cooling includes passing said mixture through plasma in the presence of a reactive gas-containing nitrogen.

* * * * *